W. F. NELSON.
CUSHIONED AUTOMOBILE WHEEL.
APPLICATION FILED FEB. 24, 1911.
1,052,009.
Patented Feb. 4, 1913.
3 SHEETS—SHEET 3.
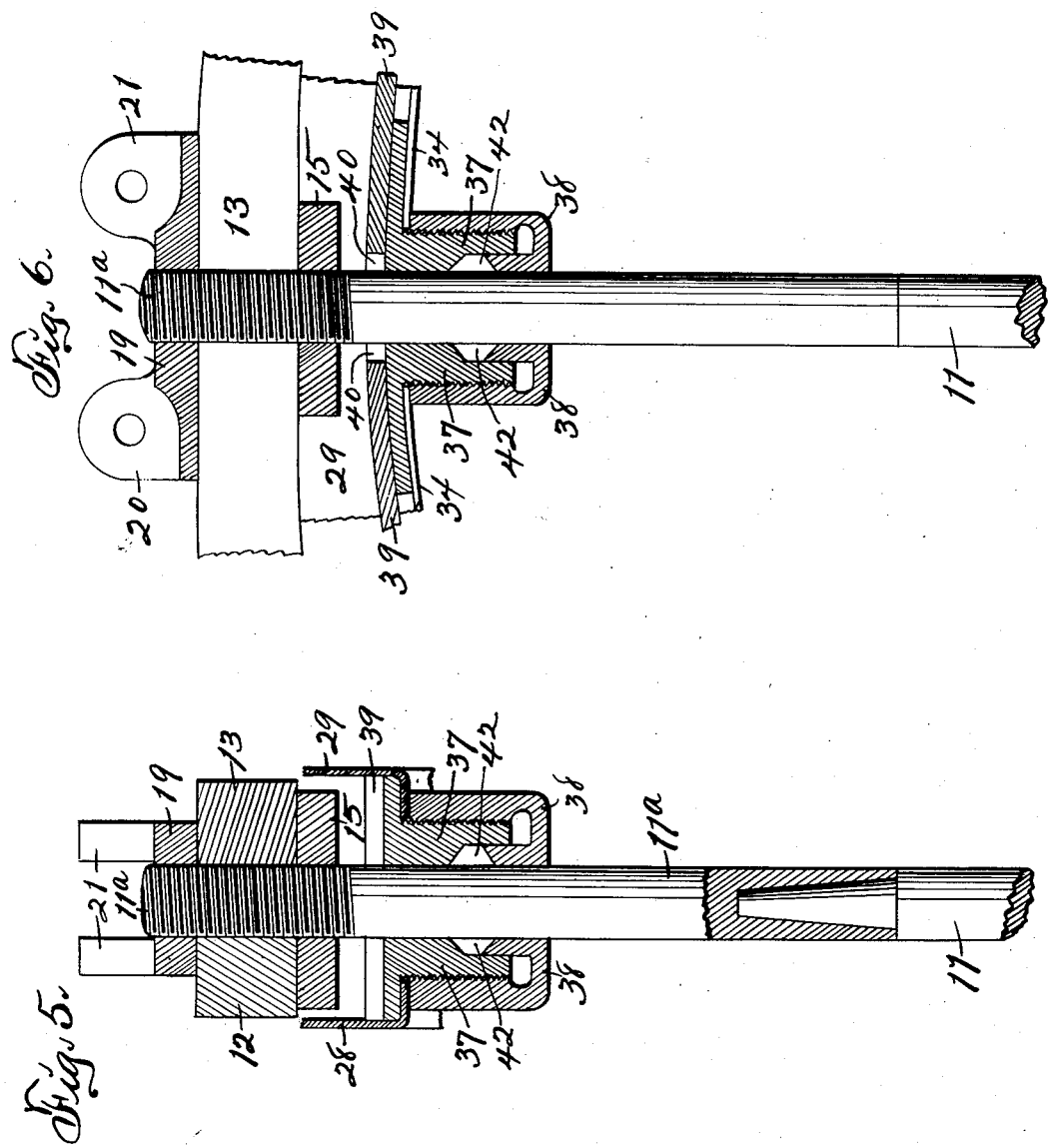
Attest:
Erle W. Miller
Earl M. Sinclair
Inventor:
Walter F. Nelson.
By Sweet Atty

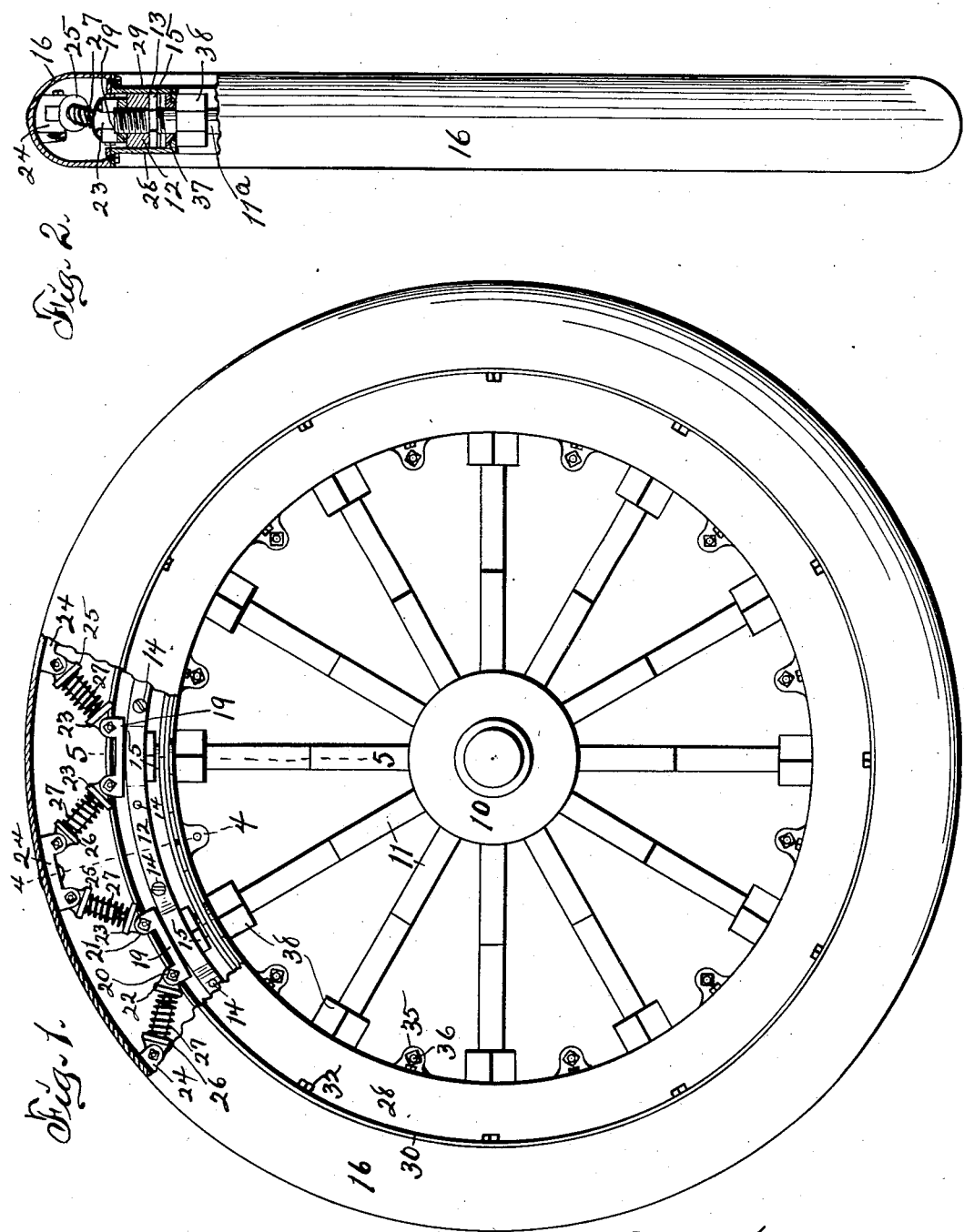

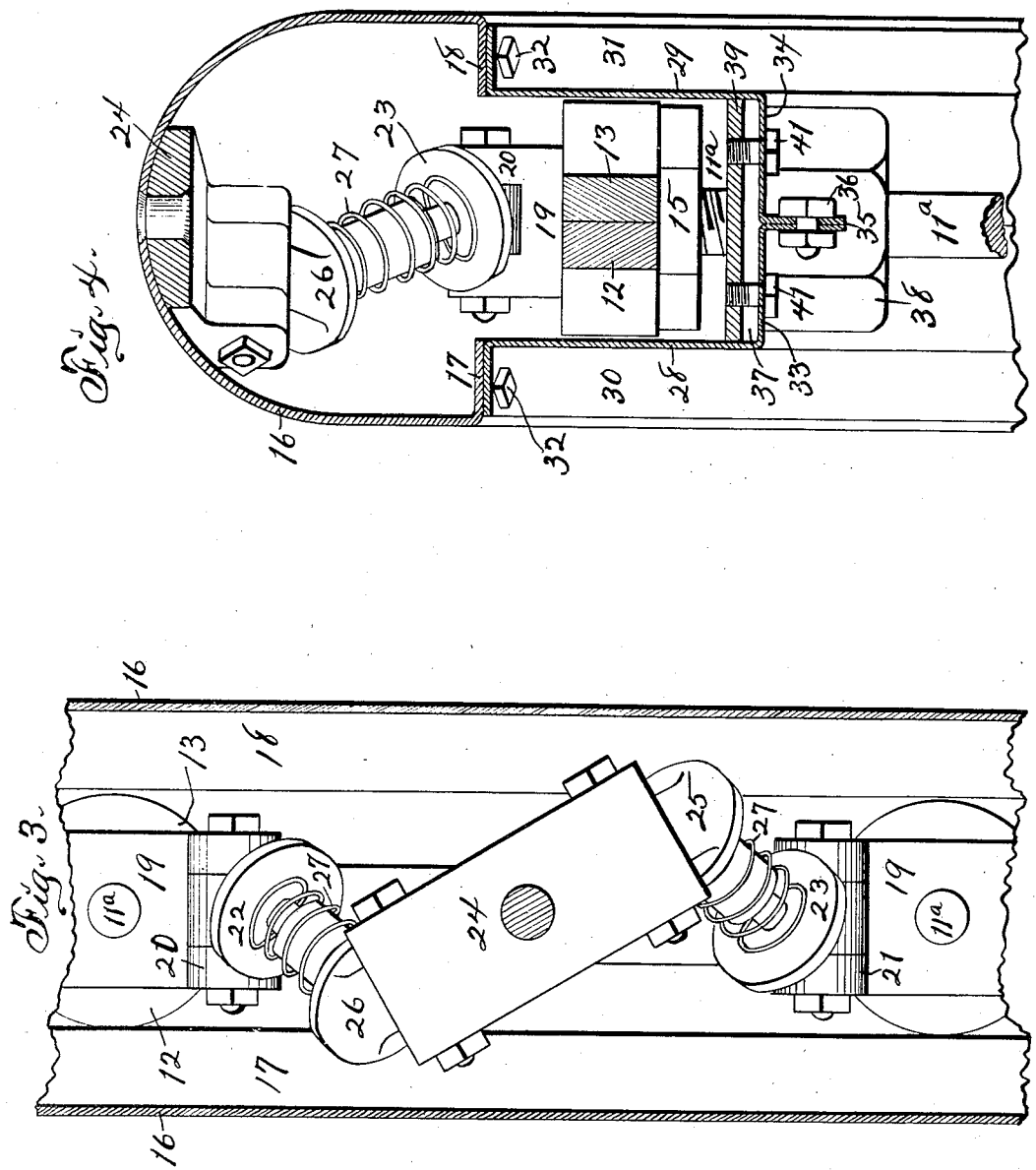

UNITED STATES PATENT OFFICE.

WALTER F. NELSON, OF EXIRA, IOWA.

CUSHIONED AUTOMOBILE-WHEEL.

1,052,009.	Specification of Letters Patent.	Patented Feb. 4, 1913.

Application filed February 24, 1911. Serial No. 611,264.

*To all whom it may concern:*

Be it known that I, WALTER F. NELSON, a citizen of the United States of America, and resident of Exira, Audubon county, Iowa, have invented a new and useful Cushioned Automobile-Wheel, of which the following is a specification.

The object of this invention is to provide an improved construction for automobile tires in which the use of rubber or composition is omitted and a construction wholly of metal is employed.

A further object of this invention is to provide an oil-tight casing adapted to contain yielding pressure devices and telescoping and pivoted devices in an automobile tire.

A further object of this invention is to provide a tire embodying a metallic tread surface or traction surface, a metallic rim, metallic yielding pressure devices and a metallic oil case.

A further object of this invention is to provide improved means for gaining access to the interior of an automobile tire.

A further object of this invention is to provide improved means for cushioning or yieldingly mounting the tread surface or traction surface.

My invention consists in the construction, arrangement and combination of elements hereinafter set forth, pointed out in my claims and illustrated by the accompanying drawing, in which—

Figure 1 is a side elevation, partly in section, of an improved wheel embodying my invention. Fig. 2 is an edge view, partly in section, of the same wheel. Fig. 3 is a longitudinal section of a part of the wheel, on an enlarged scale. Fig. 4 is a cross-section on the indicated line 4—4 of Fig. 1, on an enlarged scale. Fig. 5 is a cross-section on the indicated line 5—5 of Fig. 1, on an enlarged scale, and Fig. 6 is a section at right angles to Fig. 5 embodying the same elements.

In the construction of the wheel as shown and the tire thereon the numeral 10 designates a hub and 11 a series of spokes radiating therefrom. The hub 10 and spokes 11 may be of any desired construction and may be mounted in any desired manner on an axle (not shown). I prefer that the spokes 11 shall be made of wood for a distance outside the hub and terminate in or be tipped by metal bolts 11ª having threaded outer end portions. A metal rim of circular form is made of counterpart annular members 12, 13 placed side by side and connected by screws 14 in staggered relations therein. End portions of the bolts 11ª extend through the rim by means of apertures formed one-half in each member 12, 13 and are secured by nuts 15 on said bolts, which nuts are expanded against the inner surface of the rim. The tire 16 primarily is formed of a single piece of sheet metal and is generally of annular form and arcuate in cross-section on its tread or traction surface. The sides of the tire are straight and are formed with integral inturned flanges 17, 18, which flanges are of annular form and of materially less diameter than the tread or traction portion. The inturned flanges 17, 18 are of greater radius than the rim and are arranged on either side thereof. Yokes 19 are screwed on the threaded extremities of the bolts 11ª and against the outer surfaces of the rim members 12, 13. The yokes 19 extend longitudinally of the rim and are formed with outstanding forks 20, 21 on their ends. Headed pins or studs 22, 23 are pivoted or hinged in and to the forks 20, 21 and extend in diverging planes from said forks. Yokes 24, identical in construction with the yokes 19, are fixed to and angularly of the inner face of the arcuate portion of the tire 16 and headed sockets 25, 26 are hinged in the forks of said yokes 24 and extend in diverging planes therefrom. The sockets 25, 26 receives pins 23, 22 respectively and the connection between said sockets and pins is telescopic and sliding. Expansive coil springs 27 are mounted on the sockets 25, 26 and pins 22, 23 and impinge at opposite ends on the heads of said sockets and pins.

It is the function of the springs 27 to yieldingly separate the arcuate portion of the tire 16 from the rim of the wheel and provide a cushion between said tire and rim. The connection between the yokes 24 and tire 16 is pivotal, thus permitting said yokes to turn into various angles relative to the cross-section of the tire in use. Counterpart casing rings 28, 29 are mounted within the inner surface of the tire. The casing rings 28, 29 are formed with peripheral flanges 30, 31 fitted and adapted to be rigidly secured to the flanges 17, 18 by bolts 32. The casing rings 28, 29 also are formed with inner flanges 33, 34 concentric with the flanges 30, 31 and extending into contact with each other on the median line of the wheel, said flanges 33, 34 being notched around the spokes or spoke bolts 11ª. The flanges 33, 34 are formed with counterpart ears 35 secured together by bolts 36 extending through said ears. Flanged sockets 37 are mounted loosely on the spoke bolts 11ª and the flanges of said sockets contact loosely with the surfaces of the flanges 33, 34 nearest to the rim of the tire. The sockets 37 are exteriorly threaded and nuts 38, fitted loosely to the bolts 11ª, are screwed on said sockets and bind the sockets rigidly to the flanges 33, 34. Sealing plates 39 are mounted between the flanges of the sockets 37 and the rim of the wheel and are formed with notches 40 in their ends partially embracing the spoke bolts 11ª. The sealing plates 39 are held normally in sealing relations with the flanges of the sockets 37 by screws 41 mounted loosely through the flanges 33, 34 and screwed into said plates. The flanged sockets 37, flanges 33, 34, sealing plates 39, casing rings 28, 29 and flanges 30, 31, in conjunction with the inturned flanges 17, 18 of the tire 16, constitute and form an oil casing adapted to contain oil for lubrication of the springs, the sliding connections between the pins 22, 23 and sockets 25, 26, the pivotal connections between said pins and sockets and their yokes, the pivotal connections of the yokes 24, and the sliding connections between the sockets 37 and bolts 11ª. The sockets 37 and nuts 38 are so formed as to produce a cavity 42 around each bolt 11ª, which cavity may contain suitable packing material, thus constituting a stuffing box or gland to prevent the escape of oil on the outer surfaces of said bolts 11ª. Access is had to the interior of the tire by removing one or the other of the casing plates 28, 29. Such removal is effected by disconnecting the bolts 32, 41 and 30 and without removing the tire from the rim or spokes.

I claim as my invention—

1. In a cushioned automobile wheel, the combination of a hub, spokes radiating therefrom and threaded on their extremities, a rim formed of counterpart sections clamped together and receiving end portions of said spokes, yokes on end portions of the spokes and contacting with the periphery of the rim, a hollow metallic tire arranged concentric with the rim, yokes on the inner surface of said tire, telescoping pins and sockets on said yokes, and expansive coil springs on said pins and sockets and impinging the same at their ends.

2. In a cushioned automobile wheel, the combination of a hub, spokes radiating therefrom and threaded on their extremities, a rim receiving end portions of said spokes, nuts on said spokes engaging the inner surface of said rim, yokes on end portions of the spokes and contacting with the periphery of the rim, a hollow metallic tire arranged concentric with the rim, yokes on the inner surface of said tire, telescoping pins and sockets on said yokes, and expansive coil springs on said pins and sockets and impinging the same at their ends.

Signed by me at Exira, Iowa, this 7th day of February, 1911.

WALTER F. NELSON.

Witnesses:
J. K. VAN DE BROKE,
W. H. McNEELY.